(12) United States Patent
Fleury et al.

(10) Patent No.: US 7,907,547 B2
(45) Date of Patent: Mar. 15, 2011

(54) METHOD FOR DETERMINING CONNECTION TOPOLOGY OF HOME NETWORK

(75) Inventors: Jean-Francois Fleury, Riantec (FR); Nicolas Burdin, Rennes (FR); Jean-Baptiste Henry, Melesse (FR)

(73) Assignee: Thomson Licensing, Boulogne, Billancourt (FR)

( * ) Notice: Subject to any disclaimer, the term of this patent is extended or adjusted under 35 U.S.C. 154(b) by 782 days.

(21) Appl. No.: 11/444,056

(22) Filed: May 31, 2006

(65) Prior Publication Data

US 2006/0274673 A1  Dec. 7, 2006

(30) Foreign Application Priority Data

Jun. 1, 2005  (EP) .................................. 05291173

(51) Int. Cl.
*H04L 12/28* (2006.01)
(52) U.S. Cl. .................. 370/255; 370/254; 370/257
(58) Field of Classification Search .................. 370/254, 370/255, 256, 257, 258, 390, 432, 473; 709/220, 709/221, 222
See application file for complete search history.

(56) References Cited

U.S. PATENT DOCUMENTS

| | | | | |
|---|---|---|---|---|
| 5,519,704 A | * | 5/1996 | Farinacci et al. | 370/402 |
| 5,793,975 A | * | 8/1998 | Zeldin | 709/224 |
| 2001/0019579 A1 | * | 9/2001 | Chiou | 375/211 |
| 2003/0225916 A1 | | 12/2003 | Cheon et al. | |
| 2004/0174844 A1 | * | 9/2004 | Cho et al. | 370/328 |
| 2004/0213274 A1 | * | 10/2004 | Fan et al. | 370/401 |
| 2005/0099954 A1 | * | 5/2005 | Mohan et al. | 370/241.1 |
| 2005/0122231 A1 | * | 6/2005 | Varaiya et al. | 340/870.01 |
| 2005/0174950 A1 | * | 8/2005 | Ayyagari | 370/254 |

FOREIGN PATENT DOCUMENTS

EP  0 892 523 A2  1/1999

OTHER PUBLICATIONS

Search Report.

* cited by examiner

*Primary Examiner* — Dang T Ton
*Assistant Examiner* — Robert M Morlan
(74) *Attorney, Agent, or Firm* — Robert D. Shedd; Paul P. Kiel

(57) ABSTRACT

A method is provided in order to determine connection topology of a home network. The main idea of the present invention is to send out a topology determination message on each link of the network, wherein the topology determination message is constituted of two consecutive packets, first one being a broadcast packet with a predetermined payload that identifies it as a topology determination packet, and second one being a unicast packet with the same content and a non-existent destination MAC address. If a node receives both the broadcast and unicast packet from a sending node, the sending node is determined to be on the same physical link with said receiving node and the MAC address of the sending node is added into a local link nodes list of said receiving node, otherwise if said receiving node receives only the broadcast packet from the sending node, the send node is determined not to be on the same physical link with said receiving node.

10 Claims, 5 Drawing Sheets

METHOD FOR DETERMINING CONNECTION TOPOLOGY OF HOME NETWORK

This application claims the benefit, under 35 U.S.C. 119 of European Application 05291173.2 filed Jun. 1, 2005.

FIELD OF THE INVENTION

The present invention relates to a method for determining connection topology of Ethernet network, and more particularly to the method of determining connection topology of home network.

BACKGROUND OF THE INVENTION

In the context of a home network, it could be desirable to have information on the connection topology of the network. Home appliances are generally organized in a home environment around passive equipment like hubs or switches. Most of the time, these devices do not have any software for remote control and administration, they do not have their own IP address, in one word, they are transparent for the appliances.

However, they are not transparent in terms of network topology and messages propagation. The two main devices that are under consideration here are the hubs and the switches. As shown in FIG. 1a, hubs concentrate all the traffic in one node, i.e. each packet received on any interface is sent to all the other interfaces. As shown in FIG. 1b, a more intelligent work is done by the switch, as the packet are transmitted only on the interface where there could be interested nodes (a unicast packet is routed on the interface where the target is plugged and a broadcast packet is sent to all interfaces). The filtering could be done at the IP or Ethernet level.

Most of the products provided for standard consumers do the filtering at the Ethernet level, and most of the time they are unmanaged. Therefore it is desirable to provide a method to determine the Ethernet topology for the home network that consists of various home appliances organized around hubs and switches.

The most interesting information to extract from the network topology is to know which node of a certain terminal is separated by a switch. In that case, any traffic collision on the Ethernet bus could be avoided, when the target devices connected on a hub send unicast packets.

There are some conventional topology determination methods used in computer network systems, such as Ethernet, Token Ring, or Token Bus networks.

As indicated in European patent application No. EP0892523, a method and system for detection of bridged and repeated network device connections are provided. According to the preceding patent application, the term "bridged network device" is interchangeable with the term "switch", and the term "repeated network device" is used to extend the length, topology, or interconnectivity of a physical cabling medium, and therefore corresponds the term "hub". One preferred embodiment of the mentioned invention is accomplished by sending out test packets and noting special qualifiers. To test any given connection, a "priming" packets is initially sent out in case a switch is attached so as to cause the switch to update its address table. A first test packet with identical Source Address (SA) and Destination Address (DA) is then sent out on one link to test if the connection is a repeated loop. Then depending on the testing result of the first test packet, a second packet using a broadcast DA, a multicast DA, or a non-existent unicast DA is sent out for performing testing of a switched connection.

In US patent application of No. US2003/0225916 filed on May 30, 2002, a system and methods for implementing a data link layer communication protocol, such as Spatial Reuse Protocol (SRP) designed for use in a bidirectional, counter-rotating ring network are provided. One embodiment of this invention discloses a topology discovery process which generates a topology map in the form of a doubly linked list reflecting the results. The topology discovery process as claimed in this application comprises steps of transmitting a topology discovery packet; receiving said topology discovery packet after said topology discovery packet is updated by one or more nodes in a network coupled to the computer system; and generating a topology map of the network.

However, both of the above mentioned prior arts are complicated. Moreover, all existing topology determination methods of prior art are also failed to give any inspiration and teachings for the present invention. Therefore, a simple and efficient method for determining connection topology of the home network is greatly desirable.

SUMMARY OF THE INVENTION

According to the present invention, a method is provided in order to determine connection topology of a home network, which is constituted by a plurality of nodes organized around multiple hubs and switches.

The inventive method comprises a step of transmitting a topology determination message in a random sequence one by one by the plurality of nodes, wherein said topology determination message includes two consecutive packets, first one being a broadcast packet with a predetermined payload identifying it as a topology determination packet, and second one being a unicast packet with the same content and a non-existent destination MAC address. The connection topology of all the nodes are determined upon reception of the topology determination message based on following rules: i) if a node receives both of the broadcast packet and the unicast packet from a sending node, the sending node is determined to be on the same physical link with said receiving node; ii) if said receiving node receives only the broadcast packet, the sending node is determined not to be on the same physical link with said receiving node. Afterwards, a list of local nodes for each node is generated and updated by adding the MAC address of the sending node to the list of said receiving node when the sending node is determined to be on the same physical link with said receiving node.

Advantageously the connection topology of the home network is determined and exhibits clearly in the list of local nodes showing which nodes are on the same physical link and which nodes are separated by a switch through the foregoing topology determination process.

DETAIL DESCRIPTION OF PREFERRED EMBODIMENTS

The present invention provides a method for determining connection topology of Ethernet network, particularly home network, which comprises a plurality of nodes organized around multiple hubs and switches.

The processing of the inventive method is based on the following rules:

- On a same physical link or when plugged on a hub (let's say logical link), all nodes can see the traffic of the other nodes, even if the target device of the traffic does not exist.
- A unicast packet is routed to the interface on which the target node is plugged in a switch. If the target does not exist, the message is discarded by the switch.
- A broadcast packet is seen by every node in the network.

The main idea of the present invention is to send out topology determination messages on each link of the network in order to find out which nodes see the message, wherein the topology determination message is constituted of two consecutive packets, the first one being a broadcast packet with a predetermined payload that identifies it to be a topology determination packet, and the second one being a unicast packet with the same content and a non-existent destination MAC address. The nodes which can see this topology determination message on the network are determined to be on the same physical/logical link.

Figure 1A:
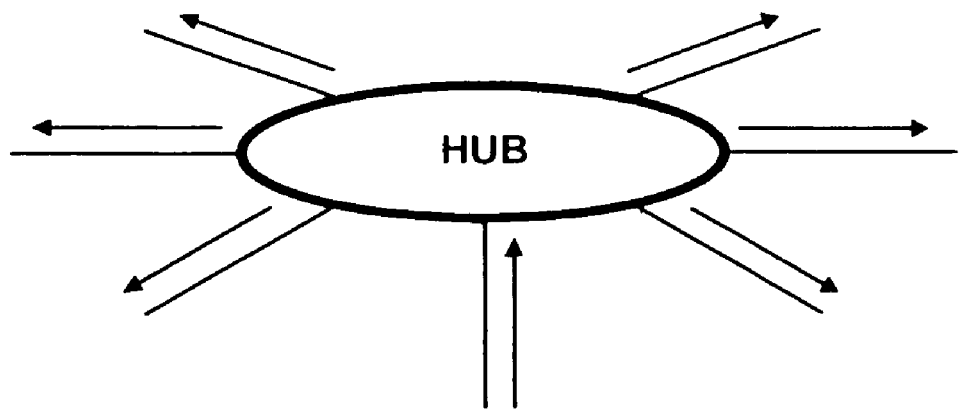
FIGS. 1a and 1b are diagrams showing the working principle of the conventional hubs and switches used in a home network.
Figure 1B:
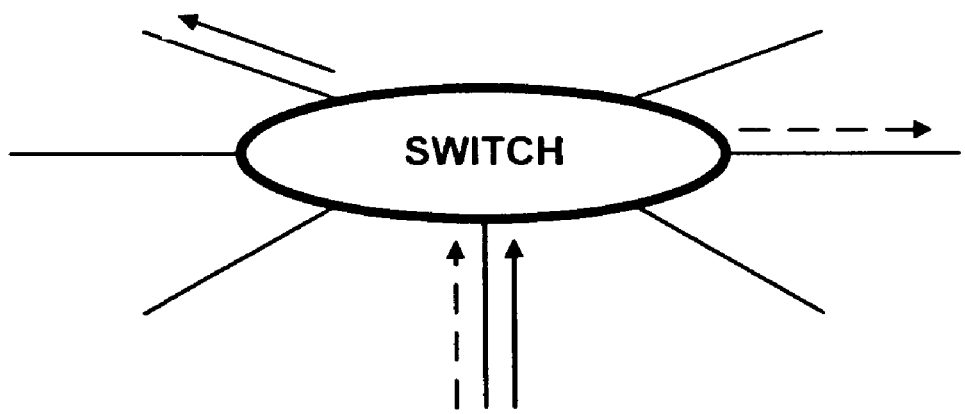
Figure 2:
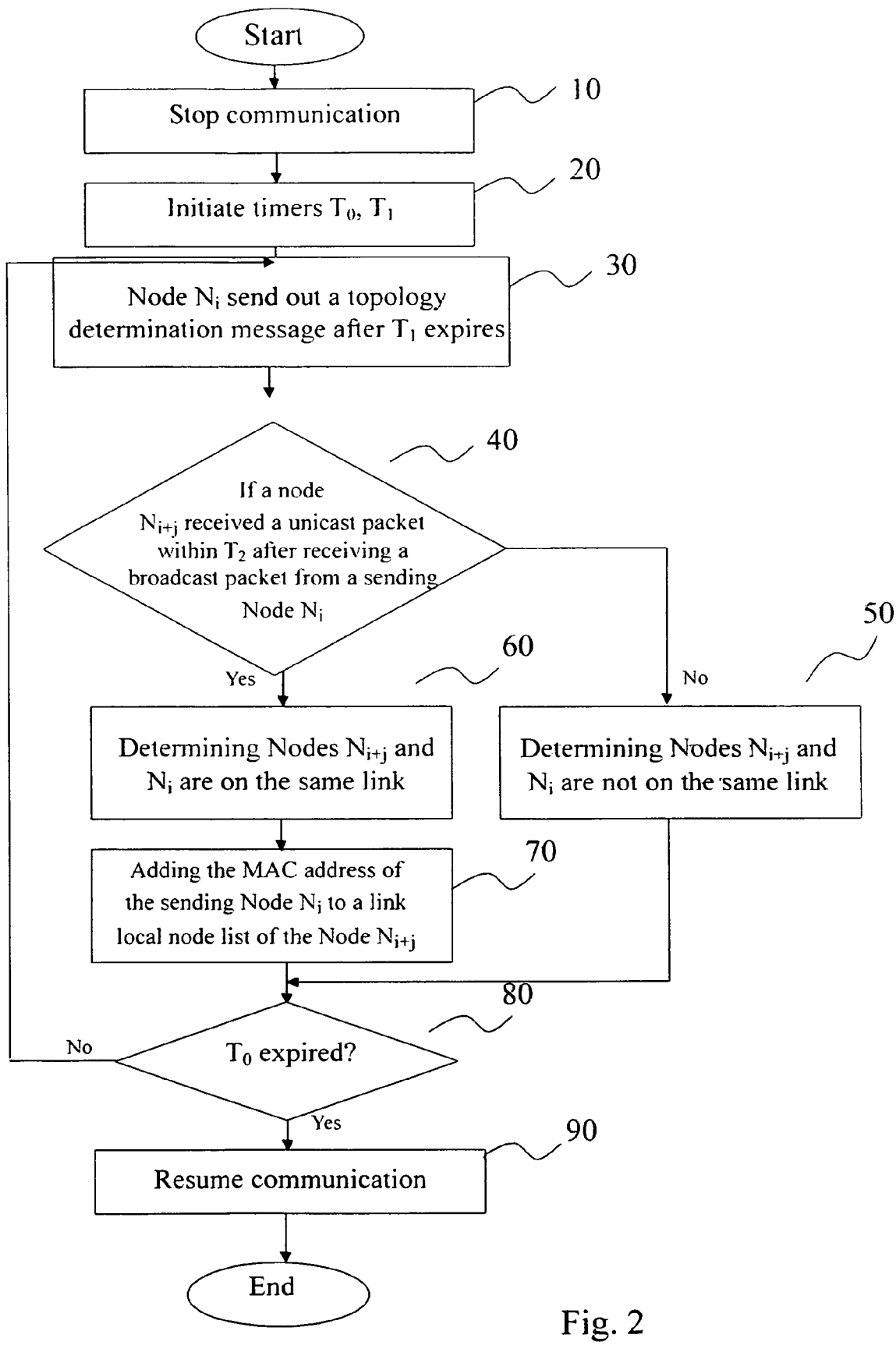
FIG. 2 shows a flow diagram illustrating the processing steps of the method according to the present invention.

FIG. 2 is a flow diagram illustrating the processing steps of the method in accordance with the present invention. First, when the topology determination process starts, all the traffic communication on the network stops as seen in step 10. In step 20, two timers $T_0$, $T_1$ are initiated when the communication on the network stops. $T_0$ is a fixed time delay defining the whole duration of the process. $T_1$ is a random bounded time delay defining a time period between the beginning of the process and the starting of the transmitting of the topology determination message on the network, and obviously $T_1 < T_0$. It should be understood that the $T_1$ random bounded time delay is intended to avoid collisions on a same physical link, as $T_1$ is randomly calculated, each one of the plurality of nodes $N_i$ (i=1 to n) has been given a different $T_1$ random bounded time delay, so that the different nodes $N_i$ have a few chance to access the Ethernet bus at the same time. In Step 30, nodes $N_i$ respectively send out the topology determination message when their corresponding $T_1$ random bounded time delay respectively expire, in such a way the topology determination messages are respectively sent out in a random sequence one by one from the sending nodes $N_i$. Normally, in the transmission of the topology determination message, the broadcast and unicast packets must be sent one after another, without collisions or other packets between them. If a collision is detected, the previous timer $T_1$ is restarted with a new random bounded delay $T_1'$ which is to be calculated according to the time remaining before expiration of the timer $T_0$.

Subsequently, in step 40, each time a receiving node $N_{i+j}$ (j≠i & i+j=1 to n) receives the broadcast packet from a sending node $N_i$, a timer with a $T_2$ delay is automatically triggered, and then if no unicast packet is received during this $T_2$ time delay, the sending node $N_i$ is assumed not to be on the same physical/logical link of said receiving node $N_{i+j}$, which is determined in step 50, otherwise, if the unicast packet is received from the sending node $N_i$ before the expiration of $T_2$, then the sending node $N_j$ is assumed to be on the same physical/logical link of said receiving node $N_{i+j}$, which is determined in step 60. In case the sending node $N_i$ and the receiving node $N_{i+j}$ are determined to be on the same physical/logical link, the destination MAC address of the sending node $N_i$ is added to a list of local nodes of said receiving node $N_{i+j}$ in step 70. In this scheme, $T_2 << T_1$, wherein timer $T_2$ is for example a few milliseconds.

Next, step 80 is to determine whether the $T_0$ fixed time delay for the process has expired, if yes, then it goes to step 90, and the communication of the network resumes, thus the process of the topology determination is ended.

Figure 3A:
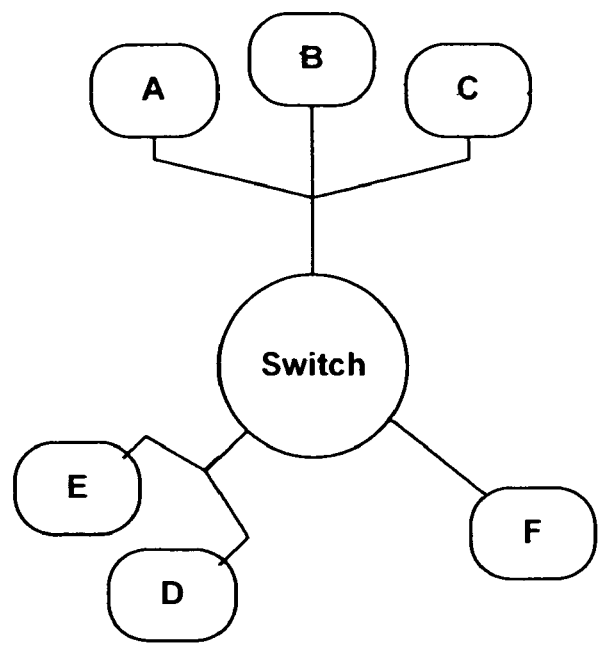
FIGS. 3a to 3e give an example of a home network explaining the operation of the process in accordance with the present invention.

With reference to FIGS. 3a to 3e, the operating of topology determination process will be described in detail through a simplified example. As shown in FIG. 3a, all nodes on the same logical link (same physical link or connected with a hub) are drawn on the same link and the different logical links are organized around a switch. When the process initiates, all nodes stop the communications and start the timer $T_0$ and $T_1$. For simplification, we will assume that the different $T_1$ timers expire for the nodes in the following order: A, B, C, D, E, and F.

Figure 3B:
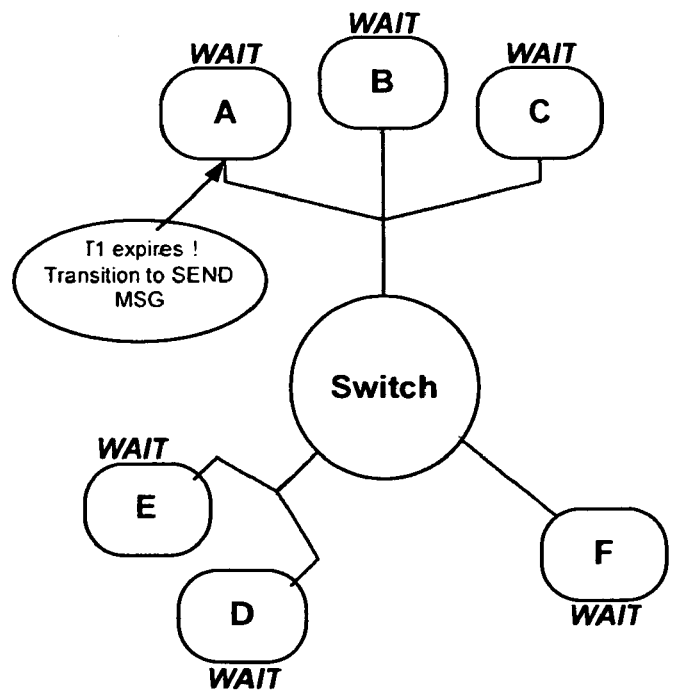
Figure 3C:
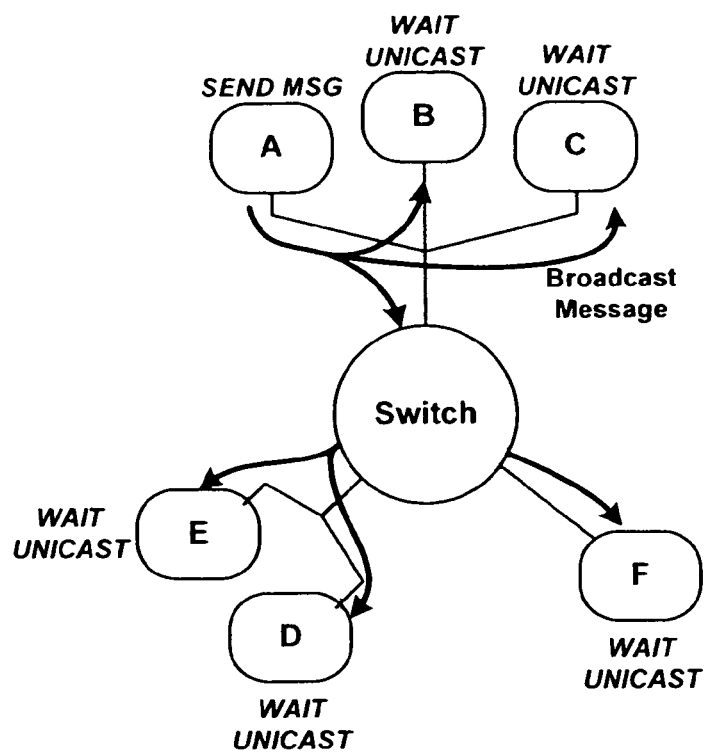
Figure 3D:
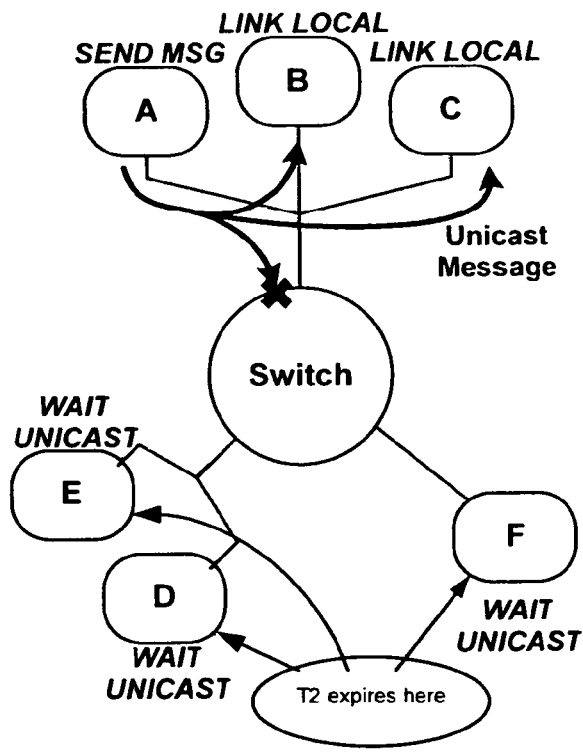
Figure 3E:
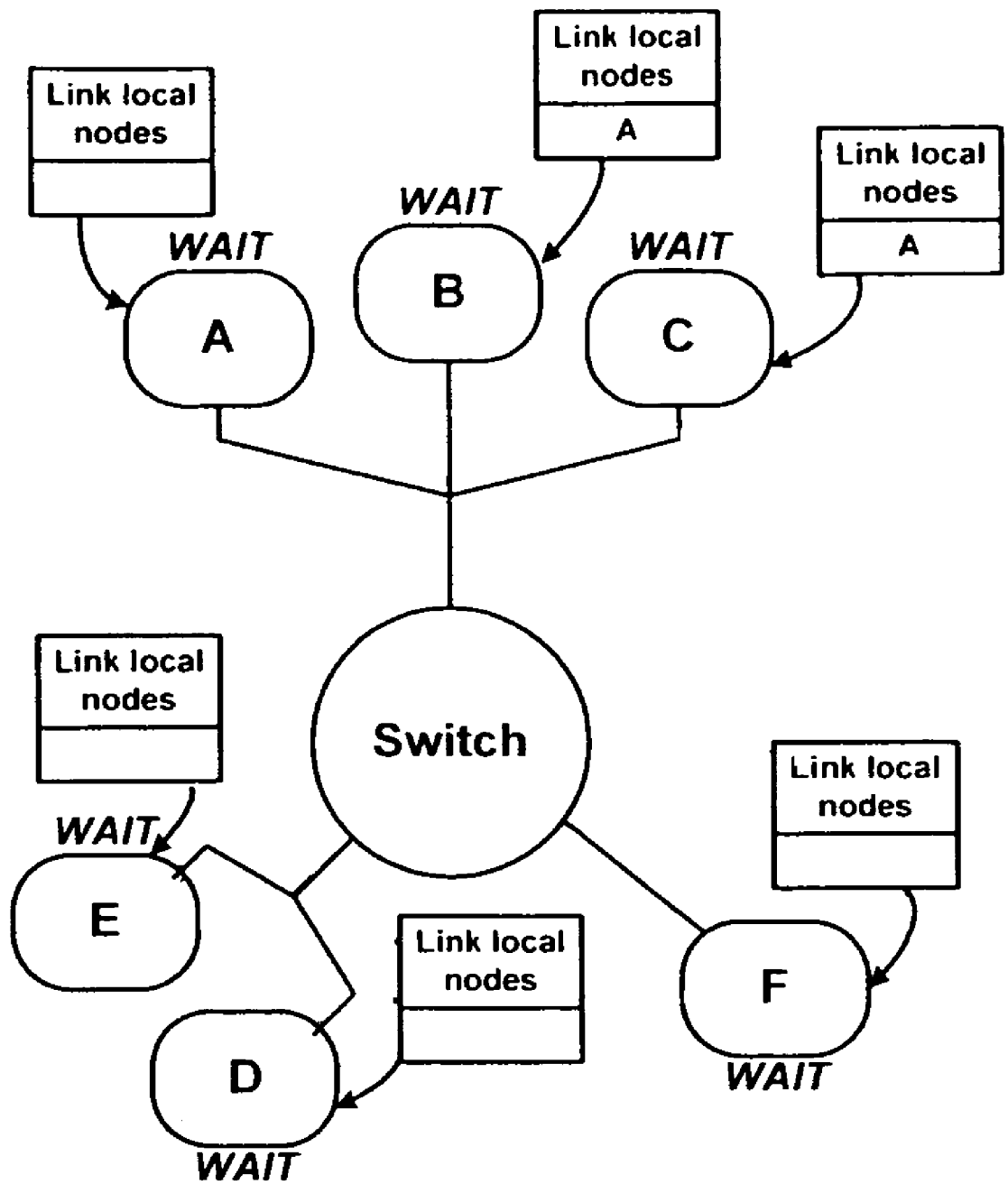

As shown in FIG. 3b, when timer $T_1$ expires, node A makes a transition to a state of SEND MSG, while all the other nodes remain in the WAIT state. Now as shown in FIG. 3c, Node A in the state of SEND MSG sends out the broadcast packet on each link of the network. The rest of the nodes B, C, D, E, and F having received the broadcast packet make transition from the state of WAIT into WAIT UNICAST state and start the $T_2$ timer. As shown in FIG. 3d, during the timer $T_2$ node A sends out the unicast packet. The unicast packet is blocked by the switch, but not blocked on the local link which is not separated by the switch. Therefore, only nodes B and C will receive this unicast packet and make a transition to LINK LOCAL state. The other nodes D, E, F will stay under the WAIT UNICAST state and keep their list of local nodes empty until the timer $T_2$ expires. Afterwards, the nodes B and C go through the transitional state LINK LOCAL in response to the messages sent by node A, the MAC address of the sending node A is added to list of local nodes of the receiving nodes B, C, as shown in FIG. 3e. The list of local nodes of Nodes D, E and F remains empty when timer $T_2$ expired, the result is seen in table 1 as following:

TABLE 1

| Node | Content of list of local nodes |
|---|---|
| A |  |
| B | A |
| C | A |
| D |  |
| E |  |
| F |  |

The process goes on with node B which follows the same steps as foregoing description. During the process, A and C will go through the LINK LOCAL state, so after that, the previous table is updated as following:

TABLE 2

| Node | Content of list of local nodes |
|---|---|
| A | B |
| B | A |
| C | A, B |
| D |  |
| E |  |
| F |  |

When the timer $T_1$ expires at node C. Only A and B will go through the LINK LOCAL state, the results as following:

TABLE 3

| Node | Content of list of local nodes |
|---|---|
| A | B, C |
| B | A, C |
| C | A, B |
| D | |
| E | |
| F | |

Then the timer $T_1$ is expired at node D, as only node E is on the same link, it is the only node to make a transition through state LINK LOCAL and the list of local nodes is only updated at node E, as seen in following table:

TABLE 4

| Node | Content of list of local nodes |
|---|---|
| A | B, C |
| B | A, C |
| C | A, B |
| D | |
| E | D |
| F | |

When the timer $T_1$ expires at node E, only D goes through the LINK LOCAL state, the MAC address of node E is added to the list of local nodes of node D as following:

TABLE 5

| Node | Content of list of local nodes |
|---|---|
| A | B, C |
| B | A, C |
| C | A, B |
| D | E |
| E | D |
| F | |

Finally when the timer $T_1$ expires at node F, where no node updates its list, as F is alone on its link, the result is as follows:

TABLE 6

| Node | Content of list of local nodes |
|---|---|
| A | B, C |
| B | A, C |
| C | A, B |
| D | E |
| E | D |
| F | |

In the end, all the nodes have a list containing the MAC address of the nodes sharing a common link therewith. This list of local nodes will be used to optimize the communications with these nodes in terms of collision detection and collision avoidance. For instance, as node F has an empty list, it can avoid implementing any collision avoidance mechanisms, and only rely on a light collision detection mechanism for the frames coming from the switch, and thus minimize delays in Ethernet transmission on this link.

The invention claimed is:

1. A method for determining connection topology of a home network, comprised of a plurality of nodes organized around multiple hubs and switches, comprising steps of:
    transmitting a topology determination message including two consecutive packets in a random sequence one by one by each of the plurality of nodes, wherein, first one of the two consecutive packets being a broadcast packet with a predetermined payload identifying it as a topology determination packet, second one being a unicast packet with the predetermined payload and a non-existent destination MAC address, and the broadcast packet and the unicast packet of said topology determination message are sent one after another without collisions or other packets between them;
    determining, by each of the plurality of nodes, the connection topology of all the nodes one by one upon reception of the broadcast packet and the unicast packet of the topology determination message;
    generating and updating, by each of the plurality of nodes, lists of local nodes of all the nodes;
    wherein
    the connection topology of all the nodes are determined based on following rule:
    i) if a receiving node receives both the broadcast packet and the unicast packet from a sending node, the sending node is determined to be on a same physical link with said receiving node.

2. The method as claimed in claim 1, wherein if said receiving node receives only the broadcast packet, the sending node is determined to be not on a same physical link with said receiving node.

3. The method as claimed in claim 1, wherein, the list of local nodes of the receiving node is generated and updated by adding the MAC address of the sending node into the list, when the sending node is determined to be on the same physical link with said receiving node.

4. The method as claimed in claim 1, wherein a first timer ($T_0$) with a fixed time delay defining the whole duration of the process is provided.

5. The method as claimed in claim 4, wherein a second timer ($T_1$) is provided, which is a random bounded time delay defining a time period between the beginning of the process and the starting of the transmitting of the topology determination message.

6. The method as claimed in claim 5, wherein the maximum length of the second timer ($T_1$) is less than the length of the first timer ($T_0$).

7. The method as claimed in claim 5, wherein a third timer ($T_2$) is automatically triggered each time said receiving node receives the broadcast packet from the sending node in order to define a duration intended to wait for the unicast packet.

8. The method as claimed in claim 7, wherein the third timer ($T_2$) is less than the second timer ($T_1$).

9. The method as claimed in claim 7, wherein the third timer ($T_2$) is less than a centisecond.

10. The method as claimed in claim 9, wherein the second timer ($T_1$) is restarted with a new random bounded delay ($T_1'$), which is expired before the expiration of the first timer ($T_0$), if a collision of the topology determination message is detected.

* * * * *